Sept. 5, 1933.   E. MENDENHALL ET AL   1,925,562

STUFFING BOX

Original Filed Nov. 9, 1927   2 Sheets-Sheet 1

INVENTORS:
EARL MENDENHALL
JUNIUS B. VAN HORN,
BY
ATTORNEY.

Sept. 5, 1933.  E. MENDENHALL ET AL  1,925,562
STUFFING BOX
Original Filed Nov. 9, 1927   2 Sheets-Sheet 2
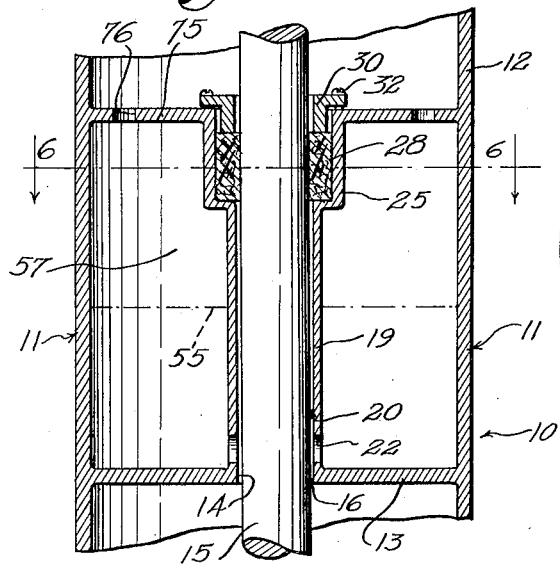
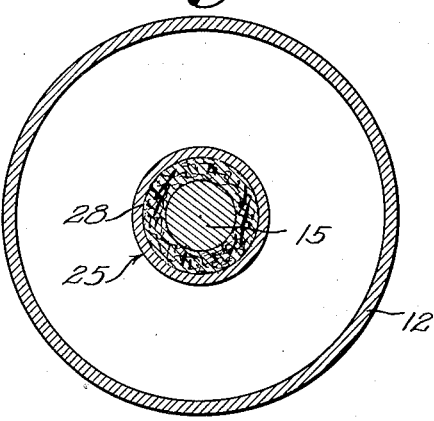
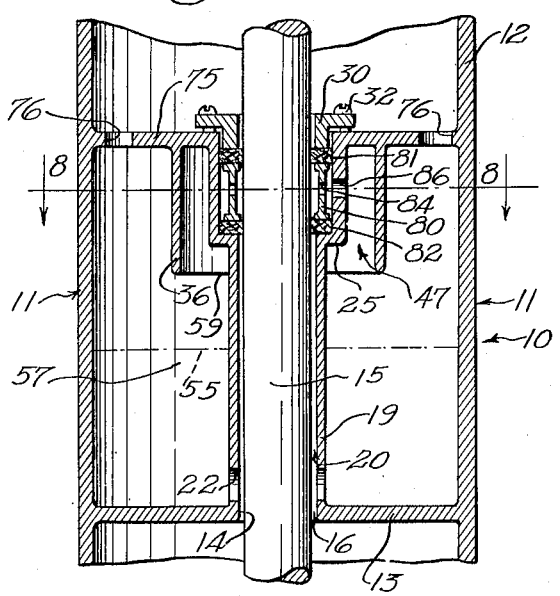
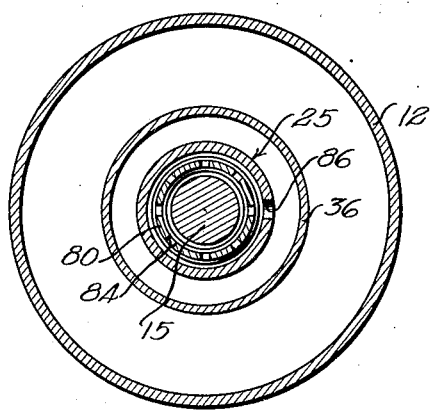
INVENTORS:
EARL MENDENHALL
JUNIUS B. VAN HORN,
BY
ATTORNEY.

Patented Sept. 5, 1933

1,925,562

UNITED STATES PATENT OFFICE 1,925,562

STUFFING BOX

Earl Mendenhall and Junius B. Van Horn, Los Angeles, Calif., assignors to Menhorn, Inc., Los Angeles, Calif., a corporation of California Application November 9, 1927. Serial No. 232,043
Renewed January 21, 1933

20 Claims. (Cl. 286—9)

Our invention relates to stuffing boxes and more particularly to a novel stuffing box for preventing the admixing of two fluids.

The ordinary form of stuffing box is formed of a packing held in a suitable container, this packing engaging the periphery of a rotating, sliding, or stationary shaft. When such a stuffing box is used submerged in a fluid, it is practically impossible to prevent leakage between the packing and the periphery of the shaft, especially where the shaft is rotating or sliding. In many installations it is desirable to use such a submerged stuffing box to close the junction between a fluid-filled container and a shaft extending therefrom. We have found by equalizing the pressures of fluids which are in contact with opposite ends of a packing, that the leakage through such a packing will be materially decreased if not entirely eliminated.

It is an object of our invention to provide a packing device, the fluid pressures on opposite ends of which are equalized.

We have found it desirable to provide a separating chamber containing separated bodies of the fluids which are in contact with opposite ends of the packing device. Such a construction is another of the objects of this invention.

If the fluids are relatively immiscible, or of different densities, or both, it is possible to have a direct contact between the two bodies of fluids in the separating chamber.

It is still another of the objects of our invention to provide a packing device having a separating chamber containing separated bodies of fluids in direct contact with each other.

It is often desirable to use such a shaft-surrounding packing device for separating two dissimilar fluids. When the end pressures on such a di-fluid-separating packing are equalized, any material flow past the packing means is prevented. However, in such an installation we have found a tendency for the fluids to intermix, or emulsify, at the surface of the shaft, especially when the shaft is rotating. Such an intermixed fluid has a very definite direction of movement through the small space between the packing and the periphery of the shaft. We have found that a thorough separation of the two intermixed fluids can be obtained by providing a relatively quiet settling chamber in communication with that end of the packing means from which the intermixed fluids flow.

It is an object of our invention to provide a packing arrangement having a settling chamber for separating any intermixture of fluids occurring in the packing arrangement.

It is a further object of our invention to provide such a settling chamber into which any intermixture of fluids is thrown by centrifugal force.

Further objects and advantages of our invention will be made evident hereinafter.

In the drawings,—

Fig. 5 is a sectional view through another form of our invention.

Fig. 6 is a cross-sectional view taken on the line 6—6 of Fig. 5.

Fig. 7 is a sectional view through still another form of our invention.

Fig. 8 is a cross-sectional view taken on the line 8—8 of Fig. 7.

Figure 1:
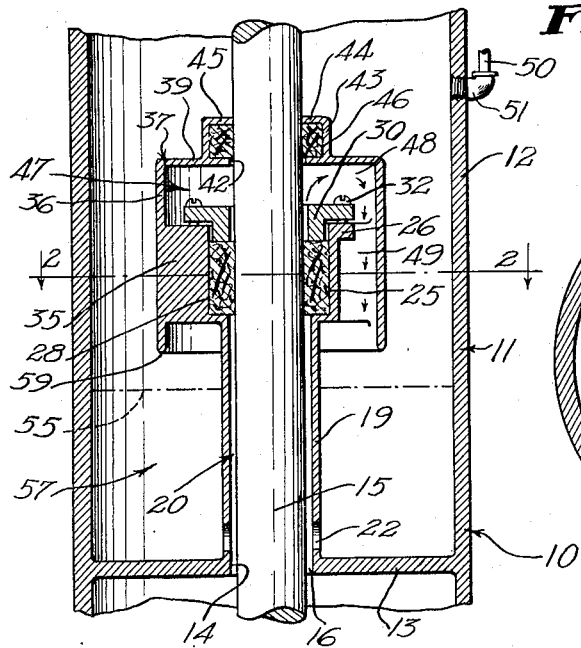
Fig. 1 is a vertical sectional view through a preferred form of our invention.
Figure 2:
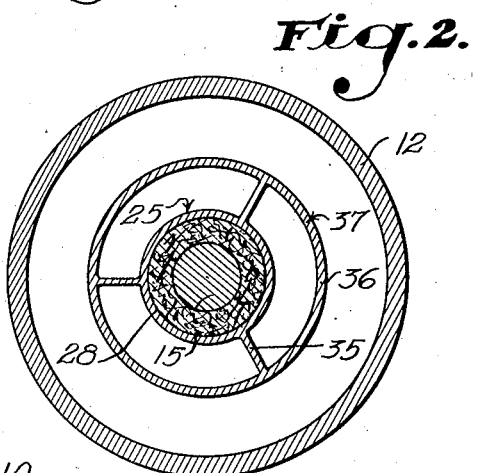
Fig. 2 is a horizontal cross section taken on the line 2—2 of Fig. 1.

Referring in particular to Figs. 1 and 2, we show a body 10 of the stuffing box of our invention. The body 10 has a shell 11 composed of a cylindrical side wall 12 closed at its lower end by a wall 13 having an opening 14 through which a shaft 15 extends, there being a clearance space 16 between the periphery of the shaft 15 and the opening 14.

Extending upward from the wall 13 and concentric with the shaft 15 is a tubular member 19 which defines a primary-fluid chamber 20 between the periphery of the shaft 15 and the tubular member 19. Openings 22 through the lower part of this tubular member communicate with the primary-fluid chamber 20, this chamber being in communication with a primary fluid below the wall 13 through the clearance space 16.

Formed at the top of the tubular member 19 is a main packing-retaining cup 25 having an upper flange 26, the interior of this cup forming a portion of the primary-fluid chamber 20. Packing 28 is adapted to be inserted in the cup 25, this packing being compressed in place by a gland 30 adjustably secured in the top of the cup 25 by screws 32 threaded into the flange 26.

Supported on webs 35 extending outward from the cup 25 is a cylindrical member 36 of an apron 37. A radial wall 39 closes the top of the cylindrical member 36, this wall, having an opening 42 through which the shaft 15 extends. Walls 43 and 44 extend upward from the radial wall 39 and cooperate therewith to form a secondary packing-retaining cup 45 containing packing 46, this packing effectively sealing the inside of the apron 37 from the outside thereof. The apron 37, together with the cup 25 and the tubular member 19, defines a settling chamber 47 composed of an annular portion 48 and a cylindrical portion 49 for a purpose to be described, the lower limit of the cylindrical portion being determined by the lower edge of the apron 37.

The upper end of the shell 11 is suitably closed by means not shown. This means may constitute a solid wall or a wall containing a suitable packing device through which the shaft 15 extends, or may consist of a column of secondary fluid as will be more fully brought out hereinafter. In any event, it is possible to supply the upper end of the shell 12 with a secondary fluid through the pipe 50 and elbow 51 which communicate with the upper interior of the shells. The lower end of the shell 12 is adapted to receive a primary fluid through the clearance space 16, the primary-fluid chamber 20 and the openings 22.

These fluids are of different densities and are preferably immiscible so that they will separate at a surface indicated by the numeral 55 in a separating chamber 57. The separating chamber 57 comprises that space inside the shell 11 not included in the settling chamber 47 and the primary-fluid chamber 20. In other words, it includes that space between the apron 37 and the shell 11 extending upward from the lower edge 59 of the apron 37, and that space extending below the lower edge of the apron 37 between the tubular member 19 and the shell 11.

The stuffing box of our invention is adapted to be installed in a position in which it is partially or wholly submerged in a body of the primary fluid. This primary fluid has access to the lower portion of the separating chamber 57 through the clearance space 16, the primary-fluid chamber 20, and the openings 22. When lowering the stuffing box into place, the primary fluid may be allowed to completely fill the shell 11, the upper level thereof being subsequently forced downward to the surface 55 by forcing secondary fluid through the pipe 50 under greater pressure than the pressure on the primary fluid, the secondary fluid being of the lower density of the two.

Another method of installing is to supply secondary fluid to the separating chamber 57 while lowering the stuffing box into the primary fluid. Still a third method is to fill the separating chamber 57 with secondary fluid and then lower the stuffing box.

When in position, the fluids will separate at a definite level such as indicated at 55 and will be in equilibrium. The pressure head on the primary fluid at this surface is of necessity proportional to the density of the primary fluid and the distance between the surface 55 and the upper external surface of the primary fluid above the body 10. Of course the pressure of the secondary fluid at the surface 55 must be equal to this primary fluid pressure inasmuch as the fluids are in equilibrium. The required pressure on the secondary fluid may be obtained in three ways depending upon the construction of the stuffing box: (1) If the top of the shell is open, then the secondary fluid will stand in the shell to such a height that the pressure at the surface 55 equals the pressure of the primary fluid at that surface. (2) If the top of the shell is closed and the pipe 50 is used, then the secondary fluid will stand in this pipe 50 to a height that the pressure on the secondary fluid equals the pressure on the primary fluid, both taken at the separating surface 55. (3) If the top of the shell and the pipe 50 are closed, then the primary fluid will force the surface 55 upward until the pressure on the secondary fluid builds up to a value equal to the pressure on the primary fluid, both pressures being taken at the surface 55.

Furthermore, should any difference in pressure between the two fluids build up, the surface 55 will move up or down until the pressures are equalized. Using the pipe 50, or the totally closed shell, this movement would be very slight. This is most clearly seen in the former case by noting the relative cross-sectional areas of the separating chamber 57 and the pipe 50. A small movement of the surface 55 will cause a large change of level in the pipe 50 so that the surface 55 will never move extensively, even should the pressure of the primary fluid vary over wide limits. When so using the pipe 50, the level therein will be substantially the same as the surface level of the primary fluid in which the body 10 is submerged, any difference in level being caused by the difference in densities of the two fluids.

Should the dividing line 55 reach the lower edge 59 of the apron 37, that portion of the surface surrounding the apron would be capable of further upward movement, but that portion between the edge 59 and the tubular member 19 would not, due to the fact that none of the secondary fluid could be forced upward inside the apron due to the top thereof being closed by the radial wall 39 and the secondary packing 46.

If the shaft 15 is rotated, there will be a tendency for the primary fluid filling the primary-fluid chamber 20 to intermix with the secondary fluid, filling the annular portion 48 of the settling chamber 47. This intermixture will take place along the surface of the shaft, and we have found that the emulsified, or otherwise intermixed fluids will rise around the shaft. When this mixture reaches the annular portion 48 of the settling chamber 47, it is given a rotary movement through contact with the periphery of the shaft. This rotary movement throws it outward and allows it to drop in the cylindrical portion 49 of the settling chamber 47. The webs 35 extending across this cylindrical portion 49 prevent any rotation therein, and the intermixture tends to separate out, the primary fluid settling to a point at or below the surface 55 and the separated secondary fluid again mixing with the main body of secondary fluid.

It should be understood that this intermixture is relatively small when the main packing 28 is new, but increases as the packing 28 wears.

Figure 3:
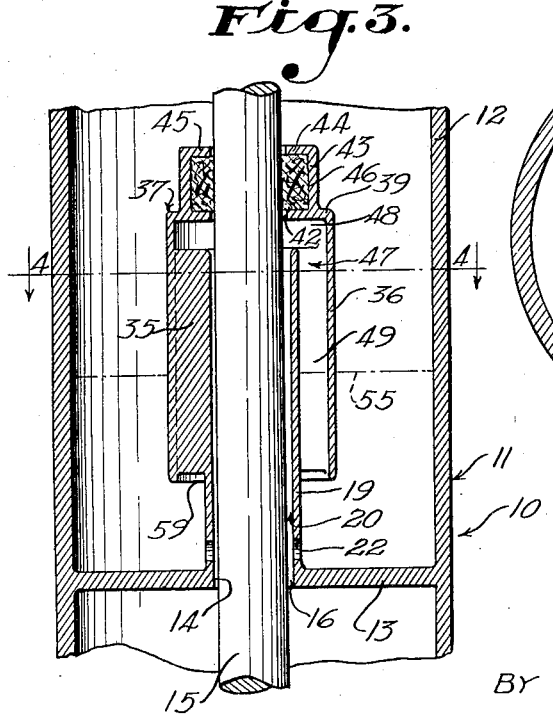
Fig. 3 is a vertical sectional view through an alternate form of our invention.
Figure 4:
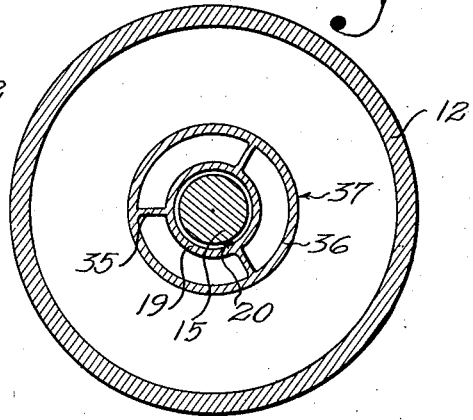
Fig. 4 is a cross-sectional view taken on the line 4—4 of Fig. 3.

It is not entirely essential to provide the main packing 28. A form of our invention not having this packing is indicated in Figs. 3 and 4. Here the primary-fluid chamber communicates directly with the annular portion 48 of the settling chamber 47. The two fluids will intermix more freely in this form of our invention but the intermixed fluids will separate out and the primary fluid will settle in the cylindrical portion 49 in a manner as previously described.

The cylindrical portion 49 of the settling chamber 47 is made longer in this embodiment so as to allow a long path in which the fluids may settle out.

The forms shown in Figs. 5 to 8 have radial walls 75 across the shell 11, these walls helping to support the main packing-retaining cup 25 and having holes 76 therethrough, these holes communicating with the separating chamber 57. These forms have no secondary packing 46.

The form shown in Figs. 5 and 6 has no apron to form a settling chamber 47, any intermixture being settled in the chamber above the wall 75 and the primary fluid dropping through the holes 76 therein.

The form shown in Figs. 7 and 8 also has the radial wall 75 and its associated holes 76 but lacks the secondary packing 46. In the main packing-retaining cup 25 in this form of the invention we prefer to place a lantern 80, separating upper and lower packings 81 and 82. The lantern has openings 84 therein, these openings communicating with the settling chamber 47 through an opening 86 in the wall of the cup 25. Any intermixture which takes place between the lower packing 82 and the shaft 15 is thrown outward through the openings 84 and 86 into the settling chamber 47 where they separate as previously described. Any intermixture which takes place between the packing 81 and the shaft 15 separates in the chamber above the plate 75 and the primary fluid drops through the openings 76 therein. This last-named intermixture is relatively small and harmless inasmuch as the space around the lantern 80 is normally filled with secondary fluid which may contain only a trace of the primary fluid.

We claim as our invention:

1. In a stuffing box adapted to prevent permanent admixture between a primary fluid and a secondary fluid, the combination of: a shaft extending from said stuffing box; packing means around said shaft; walls forming a primary-fluid chamber in communication with one end of said packing means, the other end of said packing means being in communication with said secondary fluid; and walls around said shaft and forming a separating chamber in open communication with said primary and said secondary fluids and separating any intermixture of said fluids which may take place adjacent said packing means.

2. In a stuffing box adapted to prevent permanent admixture between a primary fluid and a secondary fluid, the combination of: a shaft extending from said stuffing box; packing means around said shaft; walls forming a primary-fluid chamber in communication with one end of said packing means, said walls having one or more openings therein, the other end of said packing means being in communication with said secondary fluid; and walls forming a separating chamber, said separating chamber containing a body of said secondary fluid in the upper end thereof, the lower end of said separating chamber being in communication with said primary fluid through said openings.

3. In a stuffing box adapted to prevent permanent admixture between a primary and a secondary fluid of different densities, the combination of: a shaft extending from said stuffing box; a packing member surrounding said shaft; walls forming a primary-fluid chamber, said primary-fluid chamber being communicable with said secondary fluid through the junction between said packing member and said shaft at which junction a slight intermixture of said fluids may take place; and an apron surrounding said shaft, said apron providing a settling chamber where said intermixture of said fluids may settle out.

4. In a stuffing box adapted to prevent permanent admixture between a primary and a secondary fluid of different densities, the combination of: a shaft extending from said stuffing box; a packing member surrounding said shaft; walls forming a primary-fluid chamber, said primary-fluid chamber being communicable with said secondary fluid through the junction between said packing member and said shaft at which junction a slight intermixture of said fluids may take place; an apron surrounding said shaft, said apron providing a settling chamber where said intermixture of said fluids may settle out; and walls forming a separating chamber containing bodies of said primary and said secondary fluids.

5. In a stuffing box, the combination of: a shell containing a secondary fluid; a shaft extending into said shell; a tubular member extending upward from the bottom of said shell and surrounding said shaft, said tubular member having openings communicating between a primary-fluid chamber between said shaft and said tubular member and a separating chamber surrounding said tubular member; a packing member closing said primary-fluid chamber; and an apron surrounding said tubular member and defining a settling chamber between said apron and said tubular member, said settling chamber being adapted to settle out any intermixture of said primary and said secondary fluids which takes place at said packing member.

6. In a stuffing box, the combination of: a shell containing a secondary fluid; a shaft extending into said shell; a tubular member extending upward from the bottom of said shell and surrounding said shaft, said tubular member having openings in the lower part thereof which communicate with a primary-fluid chamber between said shaft and said tubular member; a packing member closing said primary-fluid chamber; an apron surrounding said tubular member and defining a settling chamber between said apron and said tubular member, said settling chamber being adapted to settle out any intermixture of said primary and said secondary fluids which takes place at said packing member; and walls forming a separating chamber, the lower end of said separating chamber being supplied with primary fluid through said openings and the upper end of said chamber being supplied with secondary fluid.

7. In combination with a shell and a shaft extending therefrom, said shell containing a secondary fluid: a tubular member extending into said shell around said shaft in a manner to form a primary-fluid chamber between said tubular member and said shaft and a separating chamber between said tubular member and said shell, each of said chambers having access at opposite ends to said secondary fluid and to a primary fluid; and walls forming a settling chamber communicating between the upper end of said primary-fluid chamber and said separating chamber and through which passes any mixture of said primary and secondary fluids formed in said primary-fluid chamber.

8. In combination with a shell and a shaft extending therefrom, said shell containing a secondary fluid: walls forming a primary-fluid chamber around said shaft, one end of which communicates with a primary fluid and the other end of which communicates with said secondary fluid, said fluids having a tendency to form an intermixture in said chamber; and separating means in direct communication with said chamber and receiving said intermixture, said separating means allowing said fluids to separate therein and communicating with said secondary fluid in said shell and with said primary fluid.

9. In a stuffing box structure adapted to prevent permanent admixture between primary and secondary liquids of different density, the combination of: a shell; walls defining a separating chamber in said shell containing bodies of said liquids contacting each other at a surface; a shaft; and a sealing means surrounding said shaft and positioned above said surface, opposite ends of said sealing means respectively communicating with said primary and secondary liquids whereby a slight intermixture of said liquids takes place, said intermixture separating and the heavier liquid dropping in said separating chamber to said surface.

10. A combination as defined in claim 9 including means for conducting said heavier fluid downward toward said surface.

11. In a stuffing box structure for a shaft, and adapted to prevent permanent admixture between a primary and a secondary fluid, the combination of: a tubular member around said shaft and defining an annular chamber communicating with and containing a portion of said primary fluid; and stationary walls defining a vertically extending settling chamber around said shaft and communicating with said annular chamber and containing a body of said secondary fluid, any intermixture of said fluids taking place in said annular chamber being thrown outward into said settling chamber to therein separate.

12. A combination as defined in claim 11 including walls forming a separating chamber communicating with said settling chamber and containing contacting bodies of said fluids.

13. In a structure adapted to prevent permanent admixture between primary and secondary liquids of different density, the combination of: a shell containing said secondary liquid; a rotatable shaft extending from said shell; a sealing means around said shaft and having access at opposite ends to said primary and said secondary liquids and acting to seal said primary liquid from said secondary liquid in said shell; an auxiliary sealing means around said shaft and spaced axially from said first-mentioned sealing means whereby any admixture of said liquids at said first-mentioned sealing means is discharged into the space between said sealing means and centrifugally discharged outward in said space due to the rotation of said shaft; and means in said shell for separating said liquids thus admixed.

14. In combination with a shell containing a liquid and a shaft extending from said shell: walls extending upward in said shell and forming an annular chamber around said shaft one end of which communicates with the fluid in said shell and the other end of which communicates with another fluid whereby said fluids have a tendency to form an intermixture in said annular space; an apron around said shaft and extending downward around the upper end of said walls in a manner to form a settling chamber open at its lower end and in which the heavier of said fluids in said admixture tends to separate; and walls forming a separating chamber below said apron and around said upward extending walls and containing pressure-equalized bodies of said fluids, any of said heavier fluid dropping from said settling chamber and into said separating chamber.

15. In combination with a shell and a shaft extending therefrom and into a primary fluid, said shell containing a secondary fluid, the density of which is less than the density of said primary fluid; a tubular member extending into said shell around said shaft and bounding a chamber between said tubular member and said shaft and bounding a chamber around said tubular member and inside said shell; walls defining an opening through said tubular member and through which said chambers are in communication; and an apron around said shaft and extending downward around said tubular member to form a settling chamber containing a body of said secondary fluid and in which any of said primary fluid reaching said settling chamber may settle, said settling chamber communicating with the upper end of said chamber defined between said tubular member and said shaft.

16. In combination in a structure adapted to prevent permanent admixture between a primary liquid and a secondary liquid: a shell containing said secondary liquid, the exterior of said shell communicating with said primary liquid; a shaft extending from said shell; a semi-effective sealing means around said shaft and communicating at its opposite ends with said primary and secondary liquids whereby said sealing means effects an intermixture of said liquids; walls forming a separating chamber receiving the constituents of said intermixture and containing contacting bodies of said primary and secondary liquids; and walls forming a passage communicating between said body of primary liquid in said separating chamber and said primary liquid outside said shell.

17. In combination: a shell including a wall and containing a secondary liquid; a tubular member extending upward from said wall and cooperating with said shell in defining a separating chamber; a shaft extending through said tubular member and into a primary liquid outside said shell; a semi-effective sealing means around said shaft and communicating at opposite ends with said primary liquid and said secondary liquid whereby rotation of said shaft effects a small intermixture in said sealing means of said liquids, said intermixture dropping to said separating chamber and being therein separated.

18. In combination: a shell containing a liquid; a shaft extending from said shell; a sealing means around said shaft and communicating at one end with said liquid in said shell and at the other end with a liquid outside said shell whereby the rotation of said shaft tends to form an intermixture of said sealing means; a tubular member extending upward in said shell around said shaft; an apron around said shaft and depending downward around the upper end of said tubular member; and walls defining a separating chamber around said shaft and containing bodies of said liquids, said separating chamber communicating with said intermixture whereby the constituent liquids of said intermixture separate and joint their respective bodies of said liquids in said separating chamber.

19. In combination: a shell, the exterior of said shell communicating with a primary liquid and the interior of said shell communicating with a secondary liquid of lower density than said primary liquid; a tubular member extending upward in said shell, the space in said shell around said tubular member defining a separating chamber; a shaft extending through said tubular member; an apron member sealed with respect to said shaft and extending outward and downward around the upper end of said tubular member, the interior of said apron containing a portion of said secondary liquid the lower end of said apron opening on said separating chamber; and a semi-effective sealing means around said shaft and communicating at opposite ends with said primary and secondary liquids whereby an intermixture of said liquids is formed at said sealing means, said intermixture dropping into said separating chamber and being therein separated into its constituent primary and secondary liquids.

20. In a structure adapted to prevent permanent admixture between primary and secondary liquids, the combination of: a shell containing said secondary liquid; a rotatable shaft extending from said shell; a semi-effective sealing means around said shaft and having access at opposite ends to said primary and said secondary liquids; an auxiliary sealing means around said shaft and spaced axially from said first-named sealing means whereby any admixture of said liquids at said first-mentioned sealing means is discharged into the space between said sealing means and centrifugally discharged outward in said space due to the rotation of said shaft; separating means for separating said admixture; and walls defining a separating chamber into which said separating means discharges, said separating chamber including contacting bodies of said primary and secondary liquids whereby the constituents of said admixture become associated with their respective bodies of liquids in said separating chamber.

EARL MENDENHALL.
JUNIUS B. VAN HORN.